Figure 1:
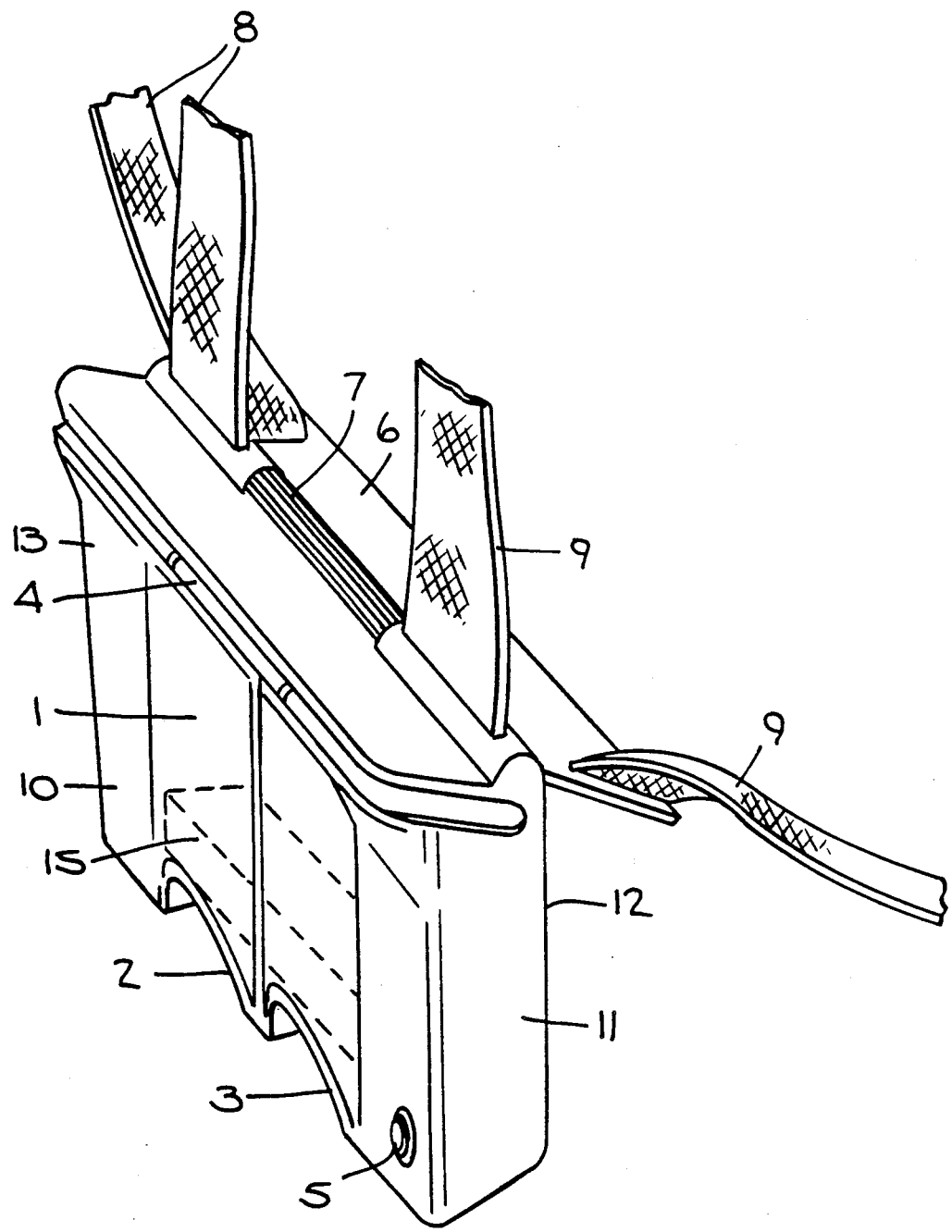

United States Patent [19]
Knoll

[11] Patent Number: 5,002,049
[45] Date of Patent: Mar. 26, 1991

[54] PORTABLE SMOKE AND GAS DISPELLER

[75] Inventor: Bas Knoll, Naaldwijk, Netherlands

[73] Assignee: Nederlandse organisatie voor Toegepast Natuur, The Hague, Netherlands

[21] Appl. No.: 333,138

[22] Filed: Apr. 4, 1989

[30] Foreign Application Priority Data

Apr. 8, 1988 [NL] Netherlands .......................... 8800905

[51] Int. Cl.⁵ ...................... A62B 29/00; A62B 37/00
[52] U.S. Cl. ............................ 128/200.28; 128/204.18
[58] Field of Search .................... 128/200.24, 200.27, 128/200.28

[56] References Cited

U.S. PATENT DOCUMENTS

| | | | |
|---|---|---|---|
| 1,974,828 | 9/1934 | Markut | 128/200.28 |
| 2,032,101 | 2/1936 | Sullivan | 128/200.28 |
| 3,921,223 | 11/1975 | Hoyecki | 128/200.27 |
| 4,377,161 | 3/1983 | Whitt | 128/200.24 |
| 4,739,753 | 4/1988 | Brehm | 128/200.24 |

FOREIGN PATENT DOCUMENTS

| | | | |
|---|---|---|---|
| 545607 | 3/1956 | Belgium | 128/200.28 |
| 1163152 | 2/1964 | Fed. Rep. of Germany | 128/200.28 |
| 558674 | 6/1977 | U.S.S.R. | 128/200.27 |

*Primary Examiner*—Edgar S. Burr
*Assistant Examiner*—Kimberly L. Asher
*Attorney, Agent, or Firm*—Rosen, Dainow & Jacobs

[57] ABSTRACT

Portable smoke and gas dispeller for use by anyone working in conditions—for instance a welder—in which hindering smoke or gas is developed and serving to prevent the smoke or gas being inhaled by the user. It comprises a housing which is affixed to the chest of the user when in use and hangs with its rear wall in front of or against the chest. It is provided with an inlet orifice and an outlet orifice, the latter being arranged such, that the air streaming out forms sort of an air-screen between the breathing area and the smoke/gas-area. Preferably it is provided with a strip or sheet which in use is affixed against the chest so that it may hinge about a horizontal axis and the direction of the outstreaming airflow remains the same.

4 Claims, 1 Drawing Sheet

PORTABLE SMOKE AND GAS DISPELLER

The invention relates to a portable smoke and gas dispeller for use by anyone working in conditions in which hindering smoke and/or gas is discharged and which serves to prevent the smoke or gas being inhaled by the user. Such apparatus is used by a welder for example. Gases and smoke are produced during welding and these are injurious to health when inhaled. The smoke and gas dispeller described herein serves to hold the smoke or gas as clear of the so-called breathing zone as much as possible.

A known method of limiting the amount of smoke or gas inhaled by a welder is to well ventilate the area in which he is working by using extraction apparatus herefor. It is even possible to provide an extraction apparatus which is so dimensioned and located as near as possible to the smoke and gas generating source so that it can extract these directly. In many cases however, the operational effectiveness hereof is highly insufficient, particularly where the distance between the extractor and ventilating provisions and the welding position further change quite frequently. Through such a situation, it is often necessary to adapt the position of the extraction apparatus with respect to the welding position. The disadvantages of such installations are that in working with such apparatus the production speed is affected adversely and that the user carries an added burden.

Better provisions are those in which the distance between the extractor and the welder always remain the same. In the interests of promoting this requirement, welding helmets with extraction facilities have been developed. Here however the disadvantage is that the welder's movements are again limited. In many cases it appears that the weight of such a helmet is too heavy. Also in the case of the alternatives to extractors known up to the present such as face-masks provided with filters and over-pressure hoods present many objections to their use. These include too heavy a weight on the head; rapid fouling-up of the filters; noise inside the hoods; a stuffy and imprisoned feeling etc. and thus they are very often unacceptable to the wearer.

The object of the invention is to provide an apparatus which combats the said smoke and gas in a fargoing manner and which does not have the known foregoingly quoted disadvantages. The smoke and gas dispeller according to the invention is characterised in that it comprises a housing which is affixed to the chest of the user when in use with its rear wall hanging in front of or against the user's chest, which is provided with one or more inlet orifices for air and an outlet orifice arranged at a constant angle of approximately 5° to 30° and preferably at approximately 15° over an arc of 180° in the horizontal plane for blowing air upward and which is provided with or can be connected to means for introducing air into the housing and for expelling the air under pressure to the exterior again via the outlet orifice.

Other than in known apparatus, this specification concerns an apparatus which blows away the smoke/gas instead of extracting it. In the case of the gas or smoke developed in welding, the so-called welding-smoke plume is blown away from the zone in which air is breathed by the user (welder) by air blown out by the apparatus itself and which air serves as a sort of airscreen between the ever rising plume and the breathing zone so that the blown air and the upwardly rising (welding) smoke are prevented from entering the breathing zone.

Air is introduced into the housing via the inlet orifice therein as the air is used to form a sort of air screen between the area from which air is inhaled and the area containing the smoke or unwanted gas and exits therefrom via the outlet orifice; otherwise than with the apparatus known so far it is not necessary to purify the air. The use of filters and the like may thus be avoided. For example, a preferable means for introducing air into the housing comprises a motor-driven blower accommodated in the housing itself and which sucks the air thereinto via the inlet orifice and which blows it to the exterior again via the outlet orifice under pressure. In this context one may also consider pressurizing air which can then be introduced into the housing from an external air supply source via the inlet orifice(s) therein.

The air outlet orifice is so constructed that when the apparatus is affixed to the user's chest, air can be blown out of the housing in all directions including both the forwards and sideways directions. To this end, the housing is provided with a mainly horizontally-lying slot-like outlet orifice which blows out air over an angle of 180°. The mouth of the outlet orifice is located such that the air is blown upward at the quoted angle with respect to horizontal plane.

In a constructively easy to achieve embodiment of the apparatus according to the invention, the outlet comprises a slot-like orifice or a series of suchlike orifices lying in prolongation one with respect to another and which extend approximately horizontally outward around the housing from one edge of the rear wall to the other and around the side walls and front wall of the housing.

In use in a preferred embodiment of the invention, the housing is provided on the upper edge of the rear wall with a strip or sheet-like portion affixed thereto to hinge about a substantially horizontal axis. In use, the strip-like portion is affixed to the upper part of the user's body and the housing then hangs with its rear wall to the chest or hangs downward from a hinge free of the chest. The latter arrangement being such that the quoted angle to the horizontal plane is substantially maintained even when the user bends forward.

The apparatus according to the invention is used particularly by welders as a welding-smoke dispeller. The welding smoke plume is then deflected in a direction away from the user. In the main, when the airstream is generated with the aid of a battery-driven motor, an energy-saving advantage accrues herefrom when the air is blown away only when welding starts, and then ceases to be blown again when welding stops. A welding-smoke dispeller according to the invention is also preferably provided with a sensor on its foreside which is sensitive to welding-arc produced light. When such light is produced, a motor accommodated in the housing is started and stops again when the arc-produced light is extinguished. The following data has been derived from an exemplary embodiment of a working prototype of the smoke dispeller according to the invention. The smoke dispeller has been designed and produced in the form of a flat casket with a hinge-strip and which hangs on the user's shoulders with the aid of a carrying harness, one end of which harness is affixed to the hinge-strip so that the casket remains pressed to the chest. The housing has an uninterrupted outlet slot which when in use lies at an angle of approximately 15° to the horizontal plane and is located approximately 15 cm. below the welders collar. An airstream of from 6 cm³/sec. appears to be sufficient for good operation of the apparatus. This airstream is generated by two blowers built into the housing, each with a diameter of 36 mm. and each driven by a motor, both of which motors are supplied with power from two 9-volt batteries. It appears that an optimal air discharge-rate of approximately 8 m/sec. is achieved at the slot-like outlet orifice.

Naturally and in general, the dimensions of the slot-like discharge orifice are determined by the chosen combination of airstream (volume) and air discharge-rate.

The apparatus is provided with a light-sensitive cell functioning as a sensor for detecting and reacting to the welding-arc produced light and through which reaction the blowers are switched on and off.

In comparison with local air extraction systems according to known methods the so-called reduction factor, that is to say the factor with which concentrations of welding smoke in the breathing zone are reduced, was measured and found to be improved by a factor of 7.

The invention is now further to be described with reference to the accompanying drawing which is a perspective of an exemplary embodiment of the apparatus according to the invention.

The housing 1 is provided on the front and rear sides with two air inlet orifices 2 and 3. Air is drawn into the housing via these and blown out via the slot-like orifice 4. This slot-like orifice 4 runs from the edges of the rear wall 12 (not shown on the drawing) via sidewalls 11, 13 and the front wall 10 over the whole width of the housing. The air blown out through the slot-like orifice 4 is thus blown out over an arc of 180° in the horizontal plane.

The housing 1 is provided with a light-sensitive cell means 5 by which means the housing-accommodated blower motor 15 can be switched on in the presence of welding-arc produced light or off in the absence of welding-arc produced light.

A strip-like portion 6 is affixed via a hinge 7 to the upper side of the rear wall of the housing 1. This portion 6 also remains lying against the user's chest when the latter bends forward. In the event of this occurring, then the rear wall of the housing 1 will no longer lie against the user's chest because the housing 1 will continue to substantially maintain its vertical stance through its pivoting action about the hinge 7. The carrying harness straps are indicated by the reference numerals 8 and 9 and by which means the housing 1 is suspended from the user's chest, the strip 6 continues to lie pressed against the user's chest during the movement of the welder.

I claim:

1. A portable smoke and gas dispeller suitable for use by a wearer in conditions in which hindering smoke or gas is developed, said dispeller having means to prevent the smoke or gas from being breathed by the wearer, said means emitting a stable air screen, said dispeller comprising: a single housing unit having a front wall, side walls and rear wall along with a top and bottom, said housing being positioned during use such that said rear wall is contiguous to the wearer's chest, said front and rear walls of said housing being provided with at least one air inlet orifice, a horizontally-lying slot-like air outlet orifice that extends horizontally outward around said housing from one edge of said rear wall along both of said side walls, and said front wall of said housing to the other edge of said rear wall, said orifice being arranged at a constant upward angle of approximately 5° to 30° to the horizontal plane for blowing air upward over an arc of 180° in the horizontal plane for introducing air into said single housing unit and for expelling said air under pressure via said outlet orifice and directing a stable air screen toward the breathing zone of the wearer.

2. The portable smoke and gas dispeller defined in claim 1 wherein said housing is provided on an edge of said rear wall with a strip portion affixed thereto by a hinge about a substantially horizontal axis.

3. The portable smoke and gas dispeller defined in claim 2 wherein light sensor means which is sensitive to welding-arc produced light is disposed on said front wall of said housing and which renders said blower motor operative when exposed to said welding-arc produced light.

4. The portable smoke and gas dispeller defined in claim 3 wherein said outlet orifice is arranged at a constant angle of approximately 15°.

* * * * *